(12) United States Patent
Christensen

(10) Patent No.: US 7,187,673 B2
(45) Date of Patent: Mar. 6, 2007

(54) TECHNIQUE FOR CREATING A MACHINE TO ROUTE NON-PACKETIZED DIGITAL SIGNALS USING DISTRIBUTED RAM

(75) Inventor: Leo Carl Christensen, South Jordan, UT (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 741 days.

(21) Appl. No.: 09/739,506

(22) Filed: Dec. 18, 2000

(65) Prior Publication Data

US 2002/0075864 A1    Jun. 20, 2002

(51) Int. Cl.
*H04L 12/50* (2006.01)

(52) U.S. Cl. ............ 370/378; 370/381; 370/376; 710/53; 382/304

(58) Field of Classification Search ......... 370/369, 370/370, 371, 379, 358, 375, 378, 381, 382, 370/383, 376; 382/304; 210/53
See application file for complete search history.

(56) References Cited

U.S. PATENT DOCUMENTS

| | | | | |
|---|---|---|---|---|
| 3,761,894 A * | 9/1973 | Pile et al. ............... 710/53 |
| 3,967,070 A * | 6/1976 | Srivastava et al. ......... 370/263 |
| 4,301,531 A * | 11/1981 | Lubin .................. 370/267 |
| 4,320,501 A * | 3/1982 | Le Dieu et al. ............ 370/368 |
| 4,759,010 A * | 7/1988 | Murata et al. ............. 370/379 |
| 4,905,226 A * | 2/1990 | Kobayashi ............... 370/378 |
| 4,941,141 A * | 7/1990 | Hayano ................. 370/376 |
| 5,130,979 A * | 7/1992 | Ohtawa ................. 370/374 |
| 5,282,196 A * | 1/1994 | Clebowicz ............... 370/466 |
| 5,311,517 A * | 5/1994 | Senoo .................. 370/428 |
| 5,612,633 A | 3/1997 | Kean ..................... 326/59 |
| 5,613,132 A * | 3/1997 | Clift et al. ............... 712/217 |
| 5,646,545 A | 7/1997 | Trimberger et al. .......... 326/38 |
| 5,841,771 A * | 11/1998 | Irwin et al. .............. 370/360 |
| 5,892,760 A * | 4/1999 | Athenes et al. ............ 370/379 |
| 5,909,125 A | 6/1999 | Kean .................... 326/39 |
| 5,933,023 A | 8/1999 | Young .................. 326/40 |
| 5,978,260 A | 11/1999 | Trimberger et al. ......... 365/182 |
| 6,016,315 A * | 1/2000 | Chambers et al. .......... 370/378 |
| 6,072,796 A * | 6/2000 | Christensen et al. ........ 370/379 |
| 6,157,751 A * | 12/2000 | Olson et al. ............. 382/304 |
| 6,208,641 B1 * | 3/2001 | Ruuskanen et al. ........ 370/375 |
| 6,430,180 B1 * | 8/2002 | Bohm et al. ............. 370/369 |

FOREIGN PATENT DOCUMENTS

WO    WO9709839    3/1997

\* cited by examiner

*Primary Examiner*—Doris H. To
*Assistant Examiner*—Steve Blount

(57) ABSTRACT

A signal router routes N inputs to M outputs. All inputs signals are ultimately applied to a data buss by spreading across multiple buss lines and time multiplexing. The data are read from the buss and written in identical images to K random access memories. The memories are addressed and read according to a different schedule for each of K output signals that are ultimately demultiplexed to M outputs. As each RAM image is read, another RAM image is written and vice versa. Since each RAM image contains the same data, the generation of signals from each RAM to supply each of the respective K output signals can be done at a rate that is substantially more independent of the input, buss, or RAM write operations than prior art techniques permit.

10 Claims, 2 Drawing Sheets

TECHNIQUE FOR CREATING A MACHINE TO ROUTE NON-PACKETIZED DIGITAL SIGNALS USING DISTRIBUTED RAM

FIELD OF THE INVENTION

The invention relates to non-packet signal routing or switching systems and more particularly to such systems that apply signals from a selected one of N sources to a selected one of M sinks.

BACKGROUND

In broadcast systems, video and audio data are transmitted between N originating sources to M destination sinks. Such systems cannot easily rely on packet networking technology because of the need for synchronization of the data. The sources may be recording from CD players, live feeds, digital video files, etc. The control of a broadcast facility may involve rapid switching between many such sources and sinks. Presently, there are three types of routers that are used for such systems: space multiplexing, time multiplexing, and a combination of the two. In space multiplexing, a different physical channel is formed between the source and sink as in a classic telephone switching system. In time multiplexing, all sources and all sinks are connected to the same physical channel, each using a different time slot or slots. In combination systems, the endpoints obtain time-slotted data on multiple physical channels.

When a switching system grows in terms of the number of sources and sinks it must handle, problems attend all three different kinds of systems. In time multiplexed systems, the bandwidth of the common physical channel has to be increased in proportion with the number of routes sharing the channel. Also, each connected device must be connected to the physical channel which presents interference and signal attenuation problems as the physical channel's frequency rises. In space multiplexed systems, the complexity of the switch increases geometrically as the number of endpoints rises. This is because each source must be selectively connectable to each sink, so the number of possible paths grows exponentially with the number of sources and sinks.

There is a perennial need for switches that handle digital data synchronously, and that must remain time aligned, that do not grow in complexity too fast as the endpoint capacity of the switch increases.

SUMMARY OF THE INVENTION

A switch using distributed random access memory (RAM) accepts time multiplexed inputs applied to a fast wide buss. The incoming data is imaged simultaneously by a plurality of RAMs. Upon complete imaging of a one bit of each of the inputs (collectively, a "block") by all the RAMS, another block is stored in successive range of memory cells. As each block is imaged, a respective output controller addresses the memory locations corresponding to the output stream for a respective signal to be time multiplexed on a respective output physical channel. Each RAM makes available to each output all of the incoming data. The output controller may select from a respective RAM only the data it requires to make up a respective output stream.

The technique is possible because of the high speed of large fast data busses and the electronics capable of addressing them. All incoming data on multiple physical channels, each of which may be time multiplexed, is applied to a single large buss. RAM that is capable of storing data on such high speed busses are written to with successive blocks of data from the buss. In a sense, the many-to-many physical switch interconnects characteristic of the spatial multiplexed aspect of the switch are replaced by a single interconnect—the high speed buss—like the hub of a wheel. Thus, interconnect complexity does not scale at the high rate characteristic of spatially multiplexed switches. Rather, the physical switch complexity scales linearly with the number of endpoints. In addition, the frequency demands on the devices driving the receiving and output electronics can be limited as the number of endpoints grows.

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE PREFERRED EMBODIMENTS

Figure 1:
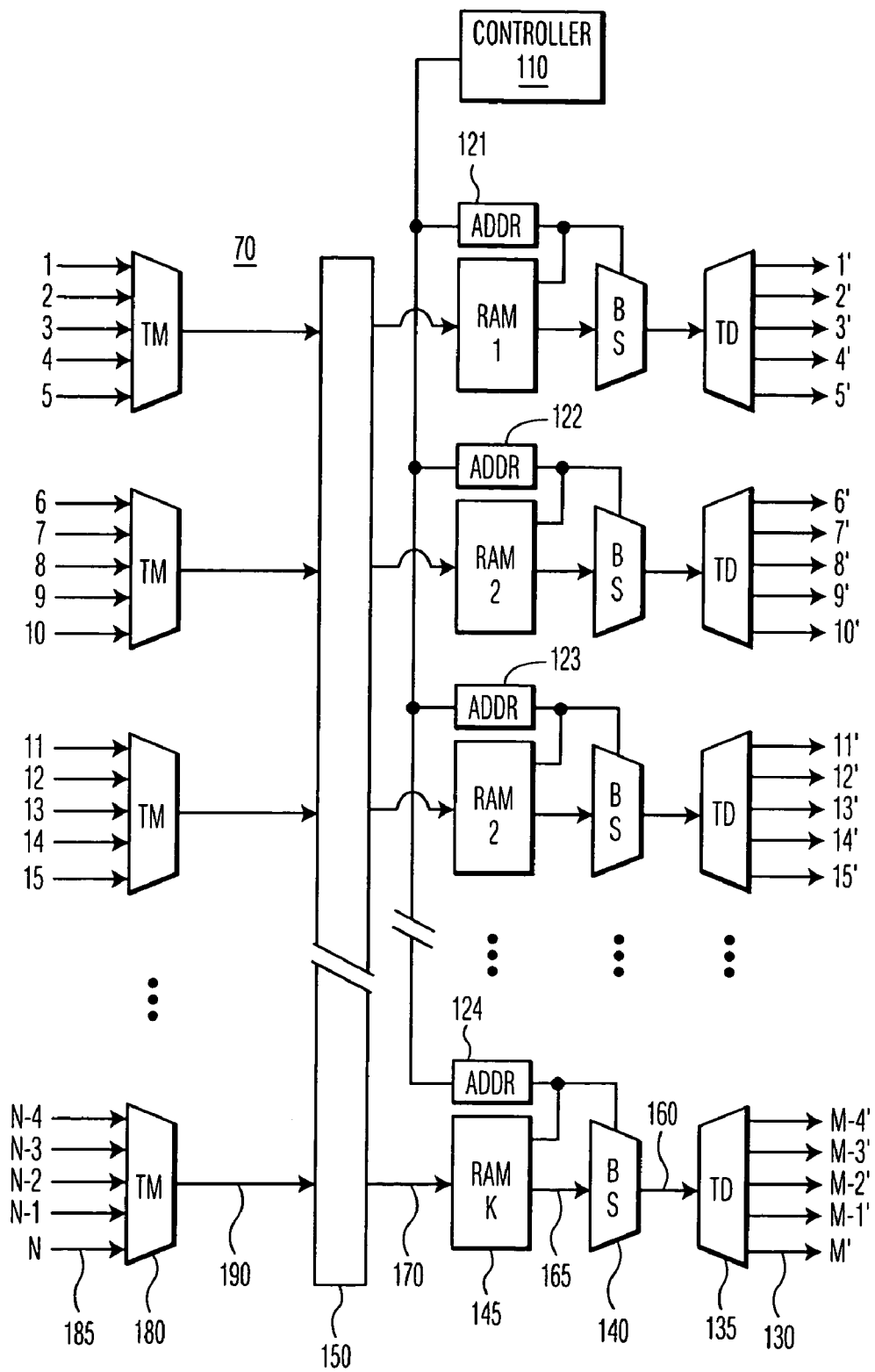
FIG. 1 is a schematic representation of a non-packet router switch according to an embodiment of the invention.

Referring to FIG. 1, signals on separate physical channels 185 arrive at respective time multiplexers 180 of a switch 70 (generically, a signal transducer). The multiplexers 180 multiplex the several separate signals arriving on the respective physical channels 185 and output them on respective channels 190. The channels 190 may be applied to a buss 150 and read simultaneously into each of several random access memories (RAMs) 145. The RAMs 145 are simultaneously imaged with data from the buss 150 in blocks of arbitrary size, in an embodiment, each block containing one bit from each physical channel 185. As a block is being written, another block is being read. The blocks may correspond to arbitrary areas of memory and reused so that the writing and reading operations over a given block alternate.

Each RAM 145 is read out by a respective addressing controller 121–124 controlled by a controller 110. As would be understood by a person of ordinary skill, the addressing controller 121–124 may be an addressing RAM (not shown) with a sequencer (not shown) where the controller 110 places a sequence of addresses in the addressing RAM which are sequentially applied to the address lines (not shown explicitly) of the respective RAM 145 in response to the sequencer.

By placing all the data from the buss 150 into RAM 145, portions of the signal on the buss 150 can be randomly accessed to generate a signal on a respective output channel 165 without the timing required if data were to be applied to the output channel 165 directly from the buss 150. The addressing controller 121–124 addresses the appropriate memory locations in each respective RAM 145 in an appropriate sequence on channel 165 to supply all bits required by the bit selector 140. The bit selector 140 finally generates a signal on a respective output channel 160 which may be time demultiplexed to form a final M output channels.

Figure 2:
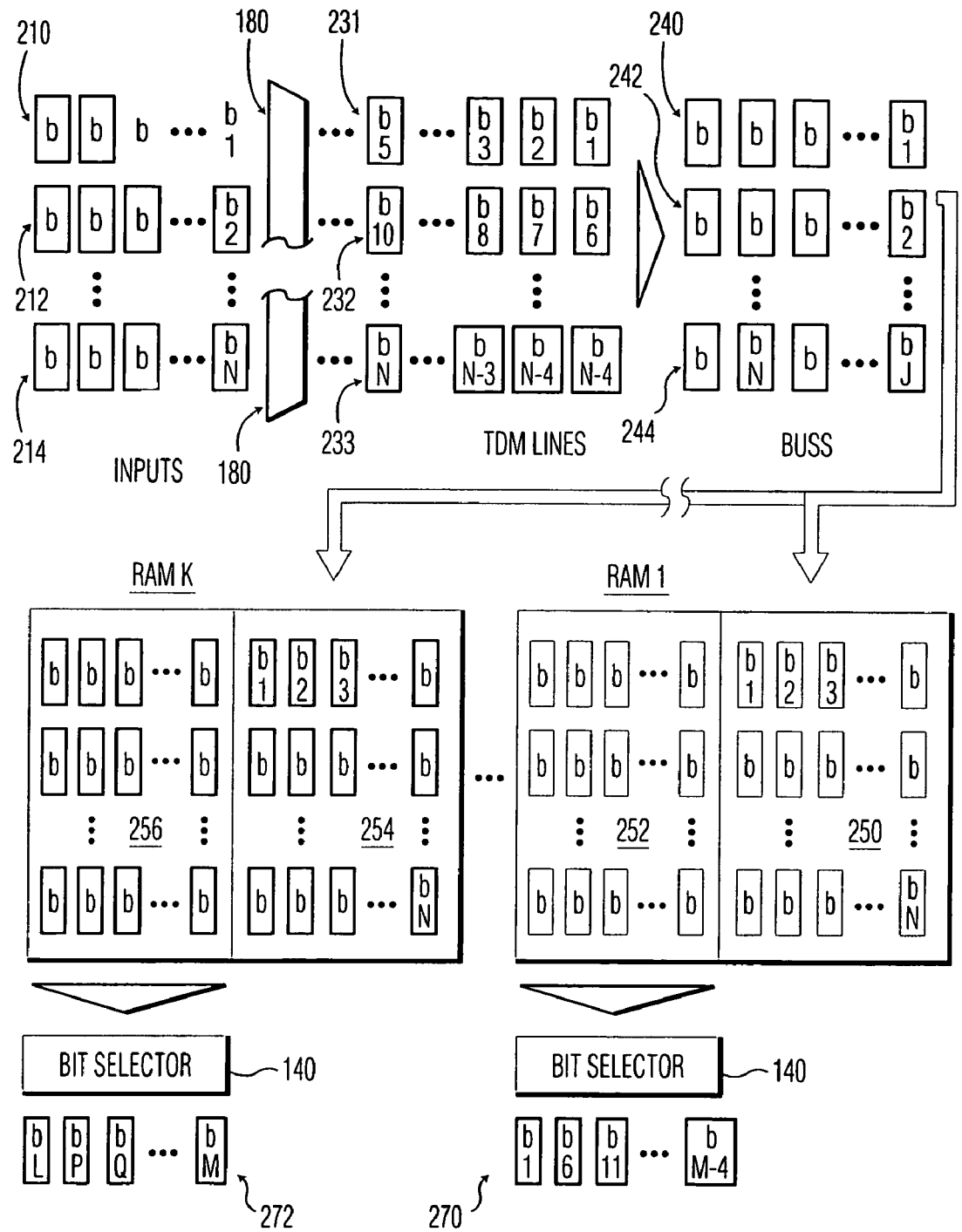
FIG. 2 is an illustration of a possible flow and storing of bits over a time interval according to a particular exemplary embodiment of the invention.

Referring now also to FIG. 2, data arriving at channels 1-N shown in FIG. 1 are illustrated as blocks, with one bit per block. A top row of bits 210 corresponds to the data sent on a first channel 1 (shown in FIG. 1). A second row of bits 212 corresponds to the data arriving on a second channel 2 (shown in FIG. 2). An Nth row of bits 214 corresponds to the data arriving on an Nth channel N (shown in FIG. 2). Note, the channels 1-N are indicated generically at 185 in FIG. 1. These rows 210, 212, through 214 represent any number of streams of data on separate physical channels 185. In the example embodiment, respective groups of these N streams 210, 212, 214 are time multiplexed by respective multiplexers 180 into N/5 time multiplexed streams 190. Although there are five channels combined per multiplexer 180 resulting in precisely N/5 multiplexed streams 190, this combination, as would be understood by a person of ordinary skill, is an arbitrary example and the number of channels 1-N per multiplexer 180 could vary from one to the next and need not even be a plurality for purposes of the invention.

Time multiplexed data streams 231, 232, and 233 represent N/5 output signals from the multiplexers 180. As illustrated, the first bit of each channel 1–5 are interleaved temporally to produce the mutliplexed data stream 231; the first bit of each channel 6–10 are interleaved temporally to produce the multiplexed data stream 232, and so on. The N/5 multiplexed data streams 231, 232, and 233 are applied to the buss 150. In the example, the buss 150 is J bits wide and the bits are applied in order, J bits per buss cycle, to the five respective buss lines (represented by data streams 240, 242, 244) from the leading end of the multiplexed data streams 121, 122, and 123. The data then on buss 150 is read into a first portion 250, 254 of each of K RAMS 145 to create an identical image in each such first portion 250, 254. The first portion 250, 254 is filled up when N bits are written into them. Then, the address controllers 121–124 read from second portions 252, 256 of the RAMs 145 and respective bit selectors 140 generate the output streams on output channels 160 according to the outputs to be mapped to the respective inputs. The bitstreams 270 and 272 represent the multiplexed streams on output channels 160. After a block of N bits is written to the first portions 250, 254 of the RAMS 145, they switch roles with the second portions 252, 256 and are read while the second portions 250 and 256 are written to. The two portions 252, 256 and 250, 254 alternate between read and write continuously as data is fed through.

Although in the embodiment described above, a single bit from each input channel is read into RAMs 145 before the first and second portions 252, 256 and 250, 254 switch roles, it is obvious that this can be done on any desired schedule as desired. That is, more than one bit input per channel 1-N could be buffered in the RAMs 145. Also, where some channels are characterized by a higher data rate that others, the number of bits buffered in the RAMs 145 need not be the same for each channel 1-N.

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A signal router, comprising:
   a conditioning circuit configured to write K identical images of a first parallel set of data from N inputs to K random access memories during a first time interval;
   K respective bit selectors each configured to read respective portions of a respective one of said K identical images;
   said K respective bit selectors being coupled to construct M output data streams during a second time interval
   wherein each of the random access memories comprises exactly two parts configured so that during the second time interval a read occurs from a first one of the parts, while a write occurs to a second one of the parts.

2. A signal router, as in claim 1, wherein said conditioning circuit includes a buss to which said first set of data is applied and addressing controllers configured to write data from said buss to said random access memories, whereby said K identical images are written.

3. The router of claim 1, wherein the parts are configured so that upon completion of the second interval, the first and second parts change roles, so that subsequently the first part is used f or the write and the second part is used for the read.

4. A signal router, comprising:
   a controller programmed to store identical images of parallel data from N inputs in K memories;
   said controller being further programmed to read respective bits of said data from each of said K memories to produce M respective output data streams, whereby N inputs are mapped to M outputs,
   wherein each of the K memories comprises exactly two parts configured so that a read occurs from a first one of the parts, while a write occurs to a second one of the parts.

5. A router as in claim 4, further comprising a data buss connected to receive said N inputs and distribute them to said K memories, wherein pre-sorting of the input data is not necessary.

6. A router as in claim 5, wherein a bit rate of each of said M output streams is less than a bit rate of said buss.

7. The router of claim 4, wherein the parts are configured so that upon completion of the second interval, the first and second parts change roles, so that subsequently the first part is used for the write and the second part is used for the read.

8. A method of routing data from N inputs to M outputs, comprising the steps of:
   applying parallel data from said N inputs to a data buss by means of at least one of time and space multiplexing;
   imaging said parallel data on K random access memories from said buss;
   reading respective sets of bits from said random access memories to form respective ones of said signals ultimately demultiplexed to form said M outputs,
   wherein each of the random access memories comprises exactly two parts configured so that a read occurs from a first one of the parts, while a write occurs to a second one of the parts.

9. The method of claim 8, wherein the parts are configured so that upon completion of the second interval, the first and second parts change roles, so that subsequently the first part is used for the write and the second part is used for the read.

10. A signal router, comprising:
N inputs for receiving synchronous streams of serial broadcast data;
a conditioning circuit configured to write K identical images of a first set of parallel data from the N inputs to K memories during a first time interval;
K respective bit selectors each configured to read respective portions of a respective one of said K identical images; and each of said K respective bit selectors being coupled to construct M output data streams during a second time interval.

* * * * *